Dec. 6, 1927.
A. WARMISHAM
1,651,493
TELESCOPIC ATTACHMENT FOR HAND CAMERAS
Filed Aug. 16, 1922
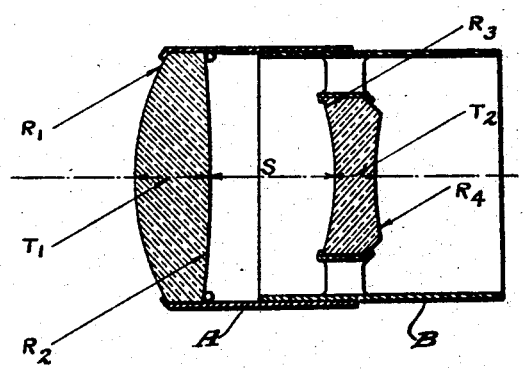
INVENTOR
Arthur Warmisham
BY Arthur L. Kent
his ATTORNEY Patented Dec. 6, 1927.

1,651,493

UNITED STATES PATENT OFFICE.

ARTHUR WARMISHAM, OF LEICESTER, ENGLAND.

TELESCOPIC ATTACHMENT FOR HAND CAMERAS.

Application filed August 16, 1922, Serial No. 582,153, and in Great Britain July 27, 1922.

This invention relates to photographic lenses and its aim is to provide inexpensive means for converting an objective of the simplest type into either a long focus combination, such as a telephoto system, or alternatively a short focus combination.

This aim is achieved by attaching in front of an ordinary objective a telescopic lens which is so designed that a simple and inexpensive construction gives useful definition by virtue of a novel method of balancing the aberrations of the combination.

From very early times it has been known that the image upon the retina can be increased in size without loss of definition by placing in front of the eye an optical combination which, receiving and emitting parallel bundles of rays, gives a magnified effect, acting in fact as a telescope, and it has been recognized that the same method can be utilized for the purpose of obtaining enlargement of the pictures in a photographic camera. This as a matter of fact is the underlying principle of British Patent 24,720/1899.

Further, Descartes proposed the use of single lenses of such length as to satisfy the telescope condition and placed before the eye for the purpose of getting enlarged retinal images.

So far as photographic applications of this known principle are concerned, the enlargement referred to has hitherto been secured only by the use of expensive means, such as are described, for example, in British Patent 24,720/1899, and this has largely arisen from the fact that the attachment has been self-corrected for the optical aberrations, i. e. corrected to a high degree to work efficiently in combination with a photographic lens similarly corrected.

Now in cheap photographic lenses, such as the simple or the achromatic meniscus, large residual aberrations are of necessity left in the lens, and further the simplest form of telescopic attachment has large residual aberrations of the opposite sign, and I propose to take advantage of these facts in my invention by combining with such photographic lenses a telescopic attachment which has been designed to balance approximately the existing aberrations of the photographic lens. These simple photographic lenses always have, for example, an under-corrected field and the telescopic combination in its simplest form has a naturally over-corrected field, and I propose to balance these two aberrations and obtain an approximation to a flat field. Similar considerations hold respecting the other optical aberrations. Thus, with this arrangement, both the photographic lens and the telescopic attachment will each have large outstanding aberrations, and on account of their simple construction can be produced very cheaply.

The attachment may consist of:—

1. A single piece telescopic combination.
2. A single piece telescopic combination made of two different glasses cemented together.
3. Two simple lenses, one convergent and the other divergent, separated by an air space.

These telescopic attachments used in combination with a photographic camera in front of the objective produce either enlarged or diminished images according as the attachment presents toward the object its convergent or divergent element.

*Numerical example.*—The drawing represents an attachment according to my invention and consisting of two simple lenses separated by an air space. $R_1$, $R_2$, $R_3$, $R_4$, represent the radii of curvature. A + sign attached to the radius of a surface indicates that such radius is convex towards light travelling in the direction $R_1$ to $R_4$. $T_1$, $T_2$, represent the axial thicknesses of the component lenses, and S the axial thickness of the air space, and the type of glass is specified by its refractive index $n_D$ for sodium light, and its nu-value. All the linear dimensions are in inches.

$R_1 +$ .417

$R_2 -$ 2.0

$R_3 -$ .437

$R_4 +$ .643

| | $n_D$ | nu-value. |
|---|---|---|
| $T_1$ .119 | 1.5227 | 56.0 |
| S .200 air | | |
| $T_2$ .060 | 1.6513 | 33.6 |

This attachment placed in front of an objective and presenting its face $R_1$ towards the object increases the equivalent focal length of the objective in the ratio 1.7. If placed in front of the objective and presenting its face $R_4$ towards the object, it diminishes the equivalent focal length in the ratio of 1.7. In both cases the focussing distance of the photographic objective, i. e. the camera length, remains undisturbed.

Further, in an attachment according to this invention and consisting of a convergent lens separated by an air space from a divergent lens, I may provide means for varying such air space (such as the telescopic tubes A, B shown in the drawing) so as to secure focussing of the combined system, attachment plus photographic objective, on an object at any desired distance without alteration of the camera extension.

What is claimed:—

1. A telescopic attachment, for use with a camera lens having residual aberrations, which consists of two optical pieces, one convergent and one divergent, and has residual aberrations opposite from those of the camera lens and substantially equal thereto.

2. A telescopic attachment, for use with a camera lens having an under-corrected field, which consists of a convergent piece and a stronger divergent piece, and has an over-corrected field.

3. A telescopic attachment, for use with a one-piece meniscus camera lens having residual aberrations, which consists of a convergent piece and a stronger divergent piece, and has residual aberrations opposite to those of the camera lens and substantially equal thereto.

4. A telescopic attachment, for use with a camera lens having residual aberrations, which comprises a divergent piece and a convergent piece separated by an air space and having residual aberrations opposite to those of the camera lens and substantially equal thereto, and means for varying the length of said air space to permit focusing the combination on an object of any desired distance in front of the attachment.

5. A telescopic attachment, for use with a camera lens, which comprises a convergent piece and a divergent piece separated by an air space, and means for varying the length of the air space to permit focusing on an object of any desired distance in front of the attachment.

In testimony whereof I have hereunto set my hand.

ARTHUR WARMISHAM.